United States Patent Office 3,424,835
Patented Jan. 28, 1969

3,424,835
PROPIOLACTONE-PIVALOLACTONE
COPOLYESTERS
Albert G. Armour, Springfield, Pa., and Erhard F. Hoegger, Wilmington, Del., assignors to E. I. du Pont de Nemours and Company, Wilmington, Del., a corporation of Delaware
No Drawing. Filed Apr. 20, 1964, Ser. No. 361,248
U.S. Cl. 264—210        14 Claims
Int. Cl. B29d 7/02; B44f 9/08; C08g 17/017

This invention relates to polymeric materials. More particularly, it relates to novel copolymers of pivalolactone and propiolactone and to films, fibers and other shaped articles prepared from them.

High molecular weight polyesters having the recurring structural unit —$CH_2$—$C(CH_3)_2$—COO— have been prepared from hydroxypivalic acid, its esters, and from its lactone, pivalolactone. Regardless of the monomer used, the structural formula of the polymeric product is the same and will be referred to herein as polypivalolactone. These polymers have been suitable for shaping into fibers that are cold-drawable to improve their properties, but they have not been found suitable for forming into self-supporting films that are draw-orientable under normally practical conditions. Copolymers of hydroxypivalic acid with several hydroxyacids, e.g., hydracylic acid ($\beta$-hydroxypropionic acid), or their cyclic intramolecular esters have been mentioned without details of their properties or of the structure of the copolymers (U.S. Patent 2,658,055, issued to T. Alderson). In addition, copolymers of pivalolactone with a number of $\alpha,\alpha$-dialkylpropiolactones in which the two alkyl groups together contain at least 3 carbon atoms, in weight ratios of 1.3 to 4.1 (25–80%, by weight, of pivalolactone) have also been described [French Patent 1,231,163 (1960)].

It is an object of this invention to provide copolymers of pivalolactone and unsubstituted propiolactone. It is another object to provide a method for preparing such polymers. Still another object is to provide elastomeric pivalolactone-propiolactone copolymers and films thereof. These and other objects will become apparent as hereinafter described.

It has now been found that high quality copolymers of pivalolactone and propiolactone containing 50–90 percent, by weight, of pivalolactone are produced by ring-opening polymerization of highly purified pivalolactone and propiolactone in which the pivalolactone is 50–90 percent, by weight, of the total monomers, in solution in an inert solvent in which an ionic initiator is dissolved, at a temperature between 20° and 100° C. Preferably, the polymerization is carried out in an inert atmosphere and until a polymer having an inherent viscosity of at least 1.0 is formed.

The copolymers of this invention having an inherent viscosity of at least 1.0 are capable of being formed into self-supporting films by melt-pressing or extrusion or by solution casting which can be line-drawn under conditions defined below to form oriented films having exceptionally good elasticity. These elastic films of copolymers of pivalolactone with propiolactone are a part of this invention. The combination of high elasticity with the other properties exhibited by these drawn films makes them of special value in certain applications, e.g., for wrapping odd shaped articles, such as machine parts, and for expanding objects such as boil-in-the-package foods (which expand during the boiling). The copolymers of pivalolactone with propiolactone of this invention are also useful for conversion to other types of shaped articles, e.g., fibers, filaments, ribbons and molded articles, e.g., floor tiles, and in coating compositions. The copolymers containing 50–70%, by weight, of pivalolactone are especially useful as adhesives.

The inherent viscosities referred to herein are viscosities calculated by the equation $$\eta_{inh} = \ln \frac{\eta_{rel.}}{C} = \ln \left(\frac{T_1}{T_0}\right) \cdot \frac{1}{C}$$

wherein $\eta_{mh.}$ is the inherent viscosity, $\eta_{rel.}$ is the relative viscosity, C is the concentration of the polymer in solution in percent, $T_0$ is the time of efflux of the pure solvent in a standard capillary viscometer, and $T_1$ is the time of efflux of the polymer solution in the same viscometer. The viscosity determinations of the polymers described herein are made in 0.5% concentration in trifluoroacetic acid at 30° C.

The monomeric pivalolactone and propiolactone used in making the copolymers of this invention should be of high purity. Such lactones, obtainable by known methods, are subjected to further purification immediately prior to polymerization. Satisfactory purification can be attained by stirring the monomers individually over calcium hydride at temperatures ranging from 20° to 45° C. under a reduced presure of about 15 mm. mercury for several hours, e.g., 10–30 hours, followed by distillation. Only the center fraction of the distillate is used for polymerization, and this fraction is used within one-half hour after distillation. The freshly purified pivalolactone and propiolactone (the proportion of pivalolactone being between 50 and 90% of the total weight of monomers) can be added simultaneously or sequentially to a solution of an ionic initiator in an inert solvent. When the monomers are added sequentially, it is preferred that the propiolactone be added first. Any inert solvent for the monomers can be used in the polymerization. Suitable solvents include ethers, e.g., tetrahydrofuran; nitriles, e.g., acetonitrile; aliphatic, saturated, hydrocarbons, e.g., hexane; and highly polar esters, e.g., phthalates and ethylene diacetate. The solvent used in the polymerization should be essentially anhydrous. When tetrahydrofuran, a preferred solvent, is employed, it is preferably purified by refluxing over calcium hydride followed by distillation with exclusion of moisture, and stored over freshly cut sodium until used. Alternatively, tetrahydrofuran can be purified by passing it through a column packed with molecular sieves.

Ionic initiators useful in preparing the copolymers of this invention include quaternary ammonium hydroxides and halides, and the alkali metal and quaternary ammonium salts of aliphatic carboxylic acids. The quaternary ammonium cations are preferably tetra-lower alkyl ammonium cations. Specific examples of suitable initiators include tetrabutylammonium hydroxide, tetrabutylammonium bromide, lithium and sodium stearates, tetrabutylammonium stearate, and the tetra-n-butylammonium salts of $\alpha,\beta$-disubstituted fatty acids. An especially effective initiator for polymerizations in nonpolar solvents is a mixture of the tetra-n-butylammonium salts, of $\alpha,\alpha$-disubstituted fatty acids having 9–11 carbon atoms, i.e., 2,2-dialkylalkanoic acid salts having a total of 9–11 carbon atoms in the acid anionic moiety of the salt, because of its good solubility in such solvents. The amount of the initiator employed may range from 0.005 to 5.0% of the weight of the monomers, and preferably 0.01 to 1.0%.

The copolymerization of pivalolactone with propiolactone can be carried out at temperatures ranging from 20° up to 100° C. It is convenient to use a temperature at which the reaction mixture refluxes. The actual temperature will, of course, be dependent on the boiling point of the particular solvent employed. With tetrahydrofuran reaction temperatures of 20° to 60° C. are satisfactory. At these reaction temperatures, polymerization times range from a few hours, e.g., 1–5 hours at the higher temperatures, up to 16–24 hours or longer at the lower temperatures. The resulting copolymer of pivalolactone and propiolactone can be isolated from the polymerization solution of methanol to precipitate the copolymer. In some cases the polymerization mixture is a gel and in this case, the gel can be cut up into small pieces and treated with methanol to isolate the copolymer. The crude copolymer is then washed further with methanol and dried.

The copolymers of this invention contain basically two kinds of polymer segments or blocks, one kind consisting of a plurality of pivalolactone units (homopolypivalolactone) and the other kind is believed to consist of a plurality of propiolactone units (essentially homopolypropiolactone) possibly interspersed with small polypivalolactone segments. For a definition of block copolymer, see Burlant and Hoffman, Block and Graft Copolymers, Reinhold Publishing Corp., New York (1960), p. 5. Evidence for such a block structure is found in X-ray reflection angles and differential thermal analysis of the copolymers. The copolymers exhibit the same X-ray reflection angles as pivalolactone homopolymer ($2\theta$ equaling 11.5°, 15.35°, 17.85°, and 23.2°, respectively). Differential thermal analysis of a pivalolactone/propiolactone copolymer containing 77.5% pivalolactone shows two endotherm peaks, one near 140° C. and the other near 237° C. The first peak is assignable to the melting of propiolactone blocks (this is also the same temperature at which the polymer melts) and the second peak is assignable to the melting of the pure homopolypivalolactone blocks. It is also known in the field of elastomers that molecules of synthetic copolymer which are elastic without vulcanization (crosslinking) generally are block copolymers of crystalline or crystallizable (by stretch-orientation) segments and amorphous segments.

The copolymers prepared as described above can be formed into films, fibers, filaments, ribbons and the like by pressing or extruding the molten polymer into the desired shape. Films, fibers and the like can also be prepared from solutions of the copolymers in solvents such as tetrahydrofuran, methyl ethyl ketone, dioxane, acetonitrile, and the like by evaporation of the solvent in conventional dry casting or spinning procedures. Solutions of the copolymers can also be used as coating compositions for applying copolymer coatings to various surfaces, e.g., wood, metal, and the like.

As indicated above, films of the copolymers of pivalolactone and propiolactone containing 50–90%, by weight, of pivalolactone, having an inherent viscosity of at least 1.0, and line-drawn, as described below, possess a combination of properties that make them especially useful in certain applications. In particular, they are highly elastic, the exact degree of elasticity and rate of recovery depending on the particular pivalolactone content of the copolymer and distribution of the different blocks along the polymer chain. Thus, an oriented copolymer film containing 72% pivalolactone can be stretched about 100% at room temperature with the film retaining only about 5% elongation a few seconds after release of tension. A copolymer film containing 77.5% pivalolactone can be stretched only about 60%, but its recovery after release of tension is more rapid and more complete. On the other hand, films of copolymers containing 50% pivalolactone can be stretched more than 100% but their recovery is much slower and not so complete. Films of copolymers containing 50–85%, by weight, of pivalolactone are especially preferred, and most preferably, 50–80%. Also, the annealed films of this invention have better dimensional stability and increased resistance to shrinkage when heated to temperatures up to 100° C.

The films of copolymers of pivalolactone and propiolactone of this invention having high proportions of pivalolactone are also hydrolytically stable, i.e., they remain tough after being immersed in boiling water for three days, or after two hours in boiling 1 N sodium hydroxide or 2 N hydrochloric acid.

The elastic pivalolactone/propiolactone copolymer films of this invention are either clear or pearlescent, depending on the temperature at which the film is drawn, on the pivalolactone content of the copolymer, and on residual solvent content of the film. As described in greater detail below, low drawing temperatures, high pivalolactone and low residual solvent contents favor pearlescent films. On the other hand, higher drawing temperatures, lower pivalolactone, and high residual solvent contents produce clear films. Both the clear and the pearlescent films are characterized by being highly elastic.

The elastic films of this invention are prepared in three steps. In the first step, an amorphous film can be prepared by melt-pressing a copolymer of pivalolactone and propiolactone containing 50–90% pivalolactone and having an inherent viscosity of at least 1.0, or alternatively drycasting a solution of such a copolymer. The melt-pressing process can be carried out by placing the finely divided copolymer on a clean metal plate with brass, chromium, aluminum, or other smooth surface and covering with a similar plate. The thickness of the metal plate is not critical, thicknesses ranging from 0.001″ up to 0.05″ or more being satisfactory. The heap of copolymer powder sandwiched between the plates is then placed between the platens of a conventional hydraulic press and heated to the temperature at which the copolymer melts. It is advantageous to have the upper platen about 5–10° C. hotter than the lower one, particularly in the melting stage. This causes the polymer to melt from the top center down and outward pushing away entrapped air, thus producing air bubble-free films. The polymer is then completely melted by bringing the press platens slowly together with just enough pressure to register on a pressure gauge. As the polymer melts, the pressure which is lost is replaced so that the pressure is kept at about the same nominal value for a total of 1–2 minutes. This is followed by pressing to 100–1000 lb./sq. in. or higher, for about 1 minute. If films of a particular thickness are desired, at least two shims are placed on opposite sides of the heap of polymer between the two metal plates to keep them spaced correctly during the pressing step. When shims are used, the exact pressure used is immaterial. If shims are not used, the final thickness of the resulting pressed film is dependent on the melting point of the polymer, the press temperature, the time at a given pressure, and the total pressure. The assembly of the copolymer film and the two metal plates is removed from the press and cooled between two thick metal plates to carry off the heat and prevent the film from bulging. After cooling, the thin metal plates are separated from the film and the film is removed. The resulting films are clear, colorless, brilliant and smooth.

As indicated hereinbefore, films of the amorphous copolymer of pivalolactone and propiolactone can also be prepared by extrusion of the molten copolymer or a plastisol thereof directly into films by conventional extrusion equipment. Such extruded films are also clear, colorless and smooth. This extrusion method is especially well suited for large scale commercial manufacture of films.

Alternatively, films of amorphous copolymer of pivalolactone and propiolactone can be prepared by dissolving a copolymer of the composition and inherent viscosity defined above in a solvent, e.g., tetrahydrofuran, methyl ethyl ketone, or mixtures of such solvents, and spreading the solution on a casting plate or drum and slowly evaporating the solvent at ordinary or elevated temperatures, the specific temperature employed depending on the particular solvent. The resulting solvent-cast film is also clear, colorless, brilliant and smooth.

The amorphous films prepared by the methods described above and having a thickness of about 1 to 10 mils can be uniformly stretched at temperatures between 100° and 130° C., but below the melting point of the copolymer, monoaxially to three times their length and higher, or biaxially to just less than three times their length and three times their width to clear, limp, plastic films. The term "uniformly stretched" or "uniform stretching" as used herein means that reaction of a film to tensile stress applied to it whereby the film thickness decreases uniformly and is dependent during all stages of stretching on the amount of extension (i.e., the total area covered by the film.

In the second step of this process, the melt-pressed, extruded, or solvent-cast film of amorphous copolymer of pivalolactone and propiolactone is subjected to line-drawing at ambient temperatures up to 90° C. to lengths ranging from 6 to 14 or more times the original length. On release of the stress of this line-drawing, the film relaxes to 55–70% of the drawn length. The term "line-drawing" as used herein means that reaction of a film to tensile stress applied to it whereby the film thickness decreases sharply along a line perpendicular to the direction of drawing. The thickness of the stretched portion of the film is approximately constant during all stages of drawing, but the total stretched area increases with the amount of extension. This line-drawing can be carried out with the film immersed in water at the desired temperature or in any inert atmosphere maintained at the desired temperature.

When clear, elastic films are desired, the line-drawing is preferably carried out at a temperature between 50° and 90° C. and with a film of copolymer containing 50–76% by weight of pivalolactone. When pearlescent films are desired, the line-drawing is preferably carried out at temperatures below 50° C., e.g., 20° to 50° C., with a film of a copolymer containing 76–90% by weight of pivalolactone. Regular vibrational variation of the extension rates during the line-drawing is also conducive to formation of pearlescent films.

In addition to the monoaxial line-drawing described above, the amorphous copolymer films (as prepared in the first step) can also be subjected to biaxial orientation by line-drawing the films sequentially in directions at right angles to each other in the plane of the film. This biaxial line-drawing produces films having physical properties more nearly the same in both the machine direction and transverse direction of the film.

The dimensional stability of the elastic, oriented films of this invention is improved by an annealing step. This annealing, which is the third step in the process of this invention, involves subjecting the oriented film, maintained in a taut condition at the area reached on relaxation after drawing, to a temperature of from 60° to 10° C. below the melt temperature of the film (preferably this will be at about 90° C.), for a time such that the annealed film on subsequent relaxation and heating to 100° C. for 5 minutes shrinks no more than 20%. Annealing times ranging from a few minutes, e.g., 5 minutes, to a few hours, e.g., 10 or more hours, are usually sufficient. While the heat treatment greatly improves the dimensional stability of the oriented, elastic films, it does not greatly affect the mechanical properties of the films at room temperature.

The pivalolactone/propiolactone copolymers, the elastic films, both clear and pearlescent, made from them, and methods of preparing the polymers and films are described in further detail in the following examples:

EXAMPLE 1

Preparation of pivalolactone/propiolactone (77.5/22.5) copolymer

A glass reaction vessel fitted with a mechanical stirrer, a reflux condenser, and an inlet tube to provide a positive pressure of nitrogen inside the vessel, is charged with 125 ml. of tetrahydrofuran and 0.02 milliequivalent of the tetra-n-butylammonium salts of $\alpha,\alpha$-disubstituted fatty acids having 9–11 carbon atoms as a 0.1 N benzene solution, and heated to a reflux temperature. There is then added with stirring and while refluxing, 11.5 g. of propiolactone and after 5 minutes 39.5 g. of pivalolactone. The temperature of the reaction mixture is kept at 55–60° C. by external heating. After heating about 5 to 15 minutes, an exothermic reaction starts and the viscosity of the mixture increases rapidly. External heating is stopped and the reaction vessel is cooled to maintain the temperature at the same level. After 25 minutes total reaction time, the clear polymer solution gels. After standing at room temperature (about 25° C.), the clear gel is cut into small pieces, extracted in methanol and then dried at 100° C. for several hours under vacuum. The resulting copolymer, melting at 165–170° C., is obtained in over 95% yield. The inherent viscosity of the polymer, determined in 0.5% solution in trifluoroacetic acid at 30° C., is 1.93. The infrared absorption spectrum of this copolymer is characterized by absorption bands at the following wavelengths (in microns), the relative strengths and other characteristics of the absorption bands being indicated in the second column.

| Wavelengths: | Characteristics |
|---|---|
| 2.90 | Weak. |
| 3.35 | Strong. |
| 3.45 | Shoulder. |
| 5.75 | Strong. |
| 6.55 | Weak. |
| 6.80 | Strong. |
| 7.2+7.3 | Doublet, medium strong. |
| 7.65 | Medium strong. |
| 8.2 | Strong. |
| 8.8 | Broad, strong. |
| 9.30 | Medium. |
| 9.8 | Broad, medium. |
| 10.6 | Weak. |
| 10.9 | Weak. |
| 11.7 | Weak, broad. |
| 12.6 | Weak. |
| 13.0 | Medium. |

EXAMPLE 2

Preparation of pivalolactone/propiolactone (72/28) copolymer

Using a procedure similar to that described in Example 1, 29.6 g. of pivalolactone is copolymerized with 11.5 g. of propiolactone (72/28 weight ratio) but, in contrast to Example 1, the polymerization mixture is maintained at reflux temperature for 3.5 hours and the polymer is precipitated from the polymerization solution by pouring the solution into excess methanol while stirring with a high speed mixer. The precipitated copolymer is separated by filtration, washed with methanol, and dried in vacuo at 100° C. There is obtained a 98% yield of a white powder. This copolymer has a melting point of 148–155° C. and an inherent viscosity (measured in 0.5% solution in trifluoroacetic acid at 30° C.) of 2.1.

EXAMPLE 3

Preparation of pivalolactone/propiolactone (72/28) copolymer

Pivalolactone is copolymerized with propiolactone in the same proportions and under the same conditions as described in Example 2 except that n-hexane is used as solvent instead of tetrahydrofuran. The copolymer precipitates on the bottom of the reaction vessel as a viscous gum during 4 hours at 65–70° C. After purification similar to description in Example 1, there is obtained a 62% yield of copolymer having an inherent viscosity of 1.3 and a melt temperature of 190–195° C.

EXAMPLE 4

Preparation of pivalolactone/propiolactone (72/28) copolymer

A polymerization is carried out using apparatus and procedure similar to that described in Example 2 with the exception that the pivalolactone and the propiolactone are mixed together, and the mixture is added to the tetrahydrofuran solution of the catalyst. After 4.5 hours of stirring, the homogeneous solution at reflux, the polymerization solution is poured into methanol to precipitate the copolymer. The precipitated polymer is washed with methanol and dried in vacuo at 100° C. There is obtained a 98% yield of copolymer of pivalolactone and propiolactone, having an inherent viscosity of 1.9.

EXAMPLE 5

Preparation of pivalolactone/propiolactone (66.5/33.5) copolymer

Using the apparatus and procedure described in Example 2 but with 40.4 g. of β-propiolactone and 80.9 g. of pivalolactone, there is obtained, after 5 hours reaction, a 96% yield of copolymer which is isolated from the polymerization solution by precipitation in methanol, washing in methanol and vacuum drying at 100° C. This copolymer has a melting point of 115–125° C. and an inherent viscosity of 1.7. The infrared absorption spectrum of this polymer shows qualitatively the same maxima as that for the polymer of Example 1. However, the ratio ($a_{9.3}/a_{13.0}$) of the absorbances at the peaks 9.3 and 13.0 A., respectively, is 1.3 for this polymer whereas the ratio is 0.7 for the polymer of Example 1.

EXAMPLE 6

Preparation of pivalolactone/propiolactone (66.5/33.5) copolymer

Following a procedure similar to that described in Example 1 and using the following proportions of ingredients, 600 ml. of tetrahydrofuran, 0.08 milliequivalent of the tetra-n-butylammonium salts of α,α-disubstituted fatty acids having 9–11 carbon atoms as a 0.1 N benzene solution, 46. g. of propiolactone and 92.8 g. of pivalolactone, a solution is obtained after polymerization for 5 hours at 65–68° C. This polymer solution is suitable for using directly in dry-casting films by evaporation of the solvent as described in Example 12(A).

EXAMPLE 7

Preparation of pivalolactone/propiolactone (60/40) copolymer

A glass reaction vessel fitted with a reflux condenser plus drying tube, thermometer and stopper is charged with 500 ml. of tetrahydrofuran and heated to reflux. While the tetrahydrofuran is refluxing, there is added 0.12 ml. of a 25% solution of tetrabutylammonium hydroxide in methanol, followed by 20 g. of propiolactone. After 2 minutes, 30 g. of pivalolactone is added and the mixture is refluxed for 6 hours. The copolymer is precipitated by addition of 1000 ml. of methanol, filtered, washed with methanol, and dried under reduced pressure (1–5 mm.) at 50–75° C. There is obtained 50 g. of copolymer, M.P. 120–125° C., having an inherent viscosity (measured at 0.5% concentration in trifluoroacetic acid) of 1.26.

EXAMPLE 8

Preparation of pivalolactone/propiolactone (50/50) copolymer

Following a procedure similar to that described in Example 7, but using 25 g. of pivalolactone and 25 g. of propiolactone in 400 ml. of tetrahydrofuran, there is obtained 43 g. of copolymer having a melting point of 105–120° C. and an inherent viscosity (measured at 0.5% concentration in trifluoroacetic acid) of 1.18.

EXAMPLE 9

Preparation of pivalolactone/propiolactone (80/20) copolymer

A glass reaction vessel fitted with a reflux condenser plus drying tube and a magnetic stirrer is charged with 16 g. of pivalolactone, 4 g. of propiolactone and 100 ml. of acetonitrile. The mixture is stirred and then 0.1 ml. of a 0.1 N benzene solution of the tetra-n-butylammonium salts of α,α-disubstituted fatty acids having 9–11 carbon atoms is added. The mixture is then heated to reflux and refluxing is continued for 8 hours. The reaction mixture is then allowed to cool and to stand at room temperature for about 60 hours. The copolymer of pivalolactone and propiolactone is precipitated by adding methanol and drying the solid in a vacuum oven. There is obtained 18.3 g. of a solid copolymer having a melting point of 148° C. and an inherent viscosity of 1.18.

EXAMPLE 10

Preparation of elastic films of pivalolactone/propiolactone copolymer (77.5/22.5)

(A) *Melt-pressing copolymer film.*—Finely divided copolymer of Example 1 is symmetrically heaped on a clean aluminum foil of 0.001" thickness. A similar piece of foil is placed on the top of the heap of polymer and the assembly is placed between the platens of a hydraulic press. The platens are heated to a temperature of 185° C. with the upper platen 5–10° C. hotter than the lower one. The polymer powder is then melted by bringing the press platens slowly together with just enough pressure to register on the pressure gauge. As the polymer melts, the pressure decreases; however, the nominal value of the pressure is maintained by replacement of the lost pressure during a total of 1–2 minutes. The film is then pressed at 1000 lb./sq. in. for one more minute. The assembly of copolymer film and metal foil sheets is removed from the press and cooled between two thick metal plates to carry off the heat and prevent the film from bulging. When cool, the aluminum foil is removed from the copolymer film. The resulting pressed film having a thickness of 4.3 mils is clear, colorless, brilliant and smooth. Another film prepared from the polymer of Example 1 in the same manner, but using shims, has a thickness of 8.5 mils. The physical properties of these films are tabulated in Table I.

A film of the copolymer of Example 1, prepared as described above and having a thickness of 5 mils, can be uniformly stretched at a temperature between 100 and 130° C., monoaxially to three times its original length to form a clear, limp, plastic film that feels like polyethylene. Another film of the same polymer of 5 mils thickness is uniformly stretched at 100–130° C. biaxially to just short of three times its original length and three times its original width with the formation of a clear, limp, plastic film.

(B) *Line-drawing of copolymer film.*—A film of pivalolactone/propiolactone copolymer of approximately 5 mils thickness prepared as described in part (A) is line-drawn as follows: Opposite edges of the film are firmly clamped and sufficient stress applied to the two clamps, with a film at an ambient temperature of 60–80° C., to monoaxially line-draw the film to six times its original length. The resulting drawing film is strong, clear, and elastic. On release of the stress, the film snaps back to four times its original length. The physical properties of this relaxed, line-drawn film are summarized in Table I.

The line-drawn film prepared as described in the preceding paragraph is annealed by heating the elastic film at 90° C. for 18 hours with the film maintained taut at its original relaxed area. The physical properties of the annealed film are summarized in Table I. While this annealing treatment does not signally change the mechanical properties at room temperature of the film, it does produce stabilization of the structure. When the annealed film is heated to approximately 100° C. for 5 minutes and then cooled, the film does not shrink appreciably but retains its original annealed dimensions.

Table I.—Properties of Pressed, Line-Drawn and Annealed Line-Drawn Pivalolactone/Propiolactone (77.5/252. Copolymer Films at 23° C.

|  | Pressed films | | Line-drawn films | | Line-drawn and annealed films | |
| --- | --- | --- | --- | --- | --- | --- |
| Direction of test |  |  | MD | TD | MD | TD |
| Film thickness, mils | 4.3 | 8.5 | 1.0 | 1.0 | 1.5 | 1.5 |
| Modulus, p.s.i.×10⁻³ | 150 | 150 | 71 | 113 | 62 | 113 |
| Strength at 3% elongation, p.s.i.×10⁻³ | 2.5 | 2.4 | 3.2 | 2.7 | 2.3 | 2.8 |
| Elongation at break, percent | 3.1 | 3.2 | 103 | 850 | 170 | 460 |
| Tensile strength,[1] p.s.i.×10⁻³ | 2.8 | 2.7 | 23 | 4.6 | 16 | 3 |
| Work-to-break,[2] kg. cm./cm.[2] |  |  | 45 | 84 | 53 | 45 |
| Tear strength, g./5.08 cm. tear/mil |  |  | 2.6 |  | 3.5 |  |
| Stress relaxation, percent of original stress after— |  |  |  |  |  |  |
| 30 min. extension to 105% |  |  |  |  | 37 |  |
| 30 min. extension to 110% |  |  |  |  | 30 |  |
| 30 min. extension to 150% |  |  |  |  | 34 |  |
| Work recovery, percent of work [3] recovered on relaxation after— |  |  |  |  |  |  |
| Extension to 105% |  |  |  |  | 71–82 | 53–61 |
| Extension to 150% |  |  |  |  | 58–64 |  |

[1] Tensile strength not corrected for thickness decrease after stretching.
[2] Work-to-break=stress-strain area to break point.
[3] Work=the area under the stress-strain curve as measured in the Instron instrument.
MD=Machine direction (direction in which film was line-drawn).
TD=Transverse direction.

EXAMPLE 11

Preparation of pearlescent film of pivalolactone/propiolactone (77.5/22.5) copolymer Another portion of the copolymer of Example 1 is pressed into a film of 4 mils thickness by the procedure described in Example 10(A). This pressed film is then formed into a pearlescent film as follows: A strip of the film approximately 0.5″ by 4″ is securely clamped at room temperature at both ends between the jaws of a manually operated film stretcher in which one of the jaws is attached to a crosshead movable by a straight gear drive. This crosshead is then moved away from the other jaw by turning the crank of the stretcher and the film becomes taut and at one place between the jaws it begins to undergo line-drawing. Care is taken that from the time of initiation of line-drawing the rate of extension is uniform and high (approximately 8″ per min.) so that the line-drawing produces a uniform pattern of void-ridden bundled polymer segments and much smaller (microscopic) clear segments. The over-all appearance of the drawn film is a highly glossy, white satin sheen. The pearlescent film is coalescible by pressure, such as with a stylus, to a clear transparent elastic film.

EXAMPLE 12

Preparation of clear, elastic, film from solvent cast film of pivalolactone/propiolactone (72/28) copolymer (A) Solution casting.—Copolymer powder made as described in Example 2, with the exception that 20% more tetrahydrofuran is employed as solvent, is dissolved in hot methyl ethyl ketone to form a 20% (weight/volume) solution. This solution is concentrated to a concentration of 25% copolymer and maintained at 50° C. This film solution is spread in a uniform layer on a flat, smooth chromium surfaced plate by means of a casting knife set at a 70 mil. clearance. The polymer solution on the casting plate is enclosed in a box and maintained at a temperature of 50° C. overnight to provide slow evaporation of the solvent in the absence of air currents. On the following day, the resulting film is solid, clear and strong, and has a thickness of 7 mils.

(B) Line-drawing.—The film obtained as described in the preceding part (A) is line-drawn at room temperature (approximately 25° C.), without significant reduction in width of the film, to a length nine times its original with the formation of a clear elastic film. On release of the tension, this film retracts rapidly to about 5.5 times its original length, and it has a thickness of about 1.5 mils. A portion of this line-drawn and relaxed film is wrapped without extension around a mandrel and heated for 1 hour at 100° C. This annealed film does not retract when maintained in a relaxed state at room temperature for 4 weeks nor after heating 10 minutes at 100° C.

A portion of the film line-drawn to 9 times its original length and relaxed to 5.5 times is line-drawn in a transverse direction to 5 times its original width. On release of tension, this film retracts to approximately 3 times its original width. The thickness of the biaxially drawn film is now about 0.8 mil.

EXAMPLE 13

Preparation of clear and pearlescent elastic films of pivalolactone/propiolactone (72/28) copolymer (A) Clear films.—The pivalolactone/propiolactone (72/28) copolymer of Example 2 is pressed at 160° C. into a just slightly hazy, colorless, smooth film of 3 mils thickness by the procedure described in Example 10(A). Following the procedure described in Example 10(B), this pressed film is line-drawn while held immersed in water at 70° C. to 9.5 times its original length. After release of the tension, the drawn film retracts to a length 6 times its original. The resulting film is then placed in a frame which maintains the length of the film at 6 times its original length and it is then annealed at about 90° C. for a period of one hour. The physical properties of this line-drawn and annealed film, measured at 23° C., are summarized below in Table II.

TABLE II.—PROPERTIES OF LINE-DRAWN, ANNEALED FILM OF PIVALOLACTONE/PROPIOLACTONE (72/28) COPOLYMER AT 23° C.

| Direction of test | MD | TD |
| --- | --- | --- |
| Film thickness, mils | 2 | 2 |
| Modulus, p.s.i. × 10⁻³ | 28 | 67 |
| Strength, at 3% elongation, p.s.i.×10⁻³ | 2.2 | 1.6 |
| Elongation at break, percent | 100 | 770 |
| Tensile strength, at break, p.s.i.×10⁻³ | 16 | 3 |

(B) Pearlescent films.—Films of the copolymer of Example 2 are prepared by pressing as described above in part (A). These pressed films are converted to pearlescent elastic films by line-drawing similar to the procedure used in Example 11, but at room temperature insted of at the elevated temperature of Example 13(A). The resulting pearlescent film has physical properties in the machine direction that are very similar to those of clear film while the properties of the pearlescent film in the transverse direction are somewhat poorer than those of the clear film. The pearlescent film tends to split along the machine direction when stress is applied transversely. These pearlescent films are also pressure-coalescible to clear, transparent, elastic films.

EXAMPLE 14

Preparation of elastic film of pivalolactone/propiolactone (66.5/33.5) copolymer The polymer of Example 5 is pressed into a film to approximately 5 mils thickness by the procedure described in Example 10(A). The resulting clear film is then line-drawn as described in Example 10(B) to 14 times its original length. On release of stress the drawn film retracts to a length about 8 times the original. The relaxed film is then heat-set at a temperature of 90° C. for 0.5 hour. The resulting brilliantly clear films have the following properties:

Modulus, p.s.i. $\times 10^{-3}$ ---------------------------- 20
Recoverable elongation, percent -------------------- 75
Elongation at break, percent -------------------- <250
Tensile strength, p.s.i. $\times 10^{-3}$ -------------------- 10

EXAMPLE 15

Preparation of fibers of pivalolactone/propiolactone (77.5/22.5) copolymer

A sample of pivalolactone/propiolactone (77.5/22.5) copolymer prepared by a method similar to that described in Example 1 is melt spun into a fiber under the following conditions. The polymer is extruded at 215–240° C. through a spinneret having one hole of 9 mils diameter. The fiber is wound up at 500–600 yds./min. A portion of this fiber, after standing one day is drawn 1.3× at 80° C. and heatset taut at 13° C. for 5 minutes. This drawn fiber has a tenacity of 1.7 g.p.d., an elongation of 119%, an initial modulus of 3.6 g.p.d., and a work-to-break value of 0.98 g.p.d. Tensile recoveries at 3, 5 and 10 percent extensions are 88, 87 and 86 percent, respectively. Work recovery at the same extensions are 72, 66 and 62 percent, respectively.

The copolymers of pivalolactone and propiolactone containing 50–90% pivalolactone are useful in many applications because of the specific properties they possess. For example, they are useful in the formation of films, fibers, filaments, ribbons, and the like, and for molding into molded objects. They are also useful as the polymeric component of coating compositions for coating various surfaces including wood, metal, and the like. The polymers having an inherent viscosity of at least 1.0 are especially useful for shaping into films that can be line-drawn into films having high elasticity with a combination of other desirable properties.

The elastic films of this invention are especially useful in the following applications because of their high elasticity combined with their other good properties. They are especially suitable for wrapping odd shaped objects such as machine parts, fowl, ripening (expanding or contracting) fruits; as inconspicuous elastic bands for wrapping gifts; for boil-in-package foods; tents; tarpaulins; rainwear; and other applications for which elastic films are used. Both clear and pearlescent elastic films of this invention are useful in the construction of ropes by twisting elastic ribbons around the axis of maximum draw. The copolymers of this invention, particularly those of 50–70% pivalolactone content, are useful as adhesives for bonding aluminum, paper and glass to themselves or to each other.

The pearlescent elastic films of this invention are especially useful in applications such as packaging, interior decoration (curtains, upholstery, tablecloths, wall liners) and fancy specialty applications. When dyed copolymer film is subjected to pearlescent drawing, the resulting pearlescent elastic film is especially useful in packaging applications.

The copolymers of this invention having pivalolactone contents of 50–70%, by weight, are especially useful as adhesives. For example, when a pivalolactone/propiolactone (60/40) copolymer power is placed between 1″ strips of polyethylene terephthalate film and between 1″ strips of a film of poly(pyromellitimidodiphenyl ether), and melt-pressed at a temperature 25° above the melting point of the copolymer, and at pressures of 50–500 lb. for 2–5 minutes, the films are firmly bonded together. The peel strengths, i.e., the force necessary to separate the strips of film, are found to be as follows: polyester films— 2.6–3.1 lb.; polyimide films—3.2–5.7 lb.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A copolymer of propiolactone and pivalolactone, containing 50 to 90 percent, by weight, of pivalolactone.
2. A copolymer of claim 1 in the form of a fiber.
3. A copolymer of claim 1 in the form of a film.
4. A copolymer of claim 1 in which the inherent viscosity is at least 1.0.
5. A film of an oriented copolymer of claim 4.
6. A film of a copolymer of claim 4 having elastic properties.
7. A pearlescent film of a copolymer of claim 6.
8. A copolymer of propiolactone and pivalolactone containing 50 to 70 percent, by weight, of pivalolactone, said copolymer having adhesive properties.
9. A process for preparing a copolymer of propiolactone and 50 to 90 percent by total weight of pivalolactone, which comprises reacting, at a temperature of from 20° to 100° C., propiolactone and pivalolactone wherein said pivalolactone comprises 50 to 90 percent by weight of the total monomers, in an inert solvent containing an ionic initiator which is a mixture of the tetra-n-butylammonium salts of 2,2-dialkylalkanoic acids having 9–11 carbon atoms in the alkanoic acid moiety.
10. The process of claim 9 wherein the solvent is tetrahydrofuran and the temperature employed is from 20° to 60° C.
11. A process for preparing elastic films of a copolymer of propiolactone and 50 to 90 percent, by weight, of pivalolactone, which comprises line-drawing an unoriented copolymer of propiolactone and 50 to 90 per cent, by weight, of pivalolactone having an inherent viscosity of at least 1.0.
12. The process of claim 11 in which the elastic film is subjected to annealing by heating it in taut condition to a temperature 10° to 60° C. below the melt temperature of the film.
13. A process for preparing pearlescent elastic films of a copolymer of propiolactone and 76 to 90 percent (by weight) of pivalolactone, which comprises line-drawing an unoriented copolymer of propiolactone and 76 to 90 percent by weight of pivalolactone having an inherent viscosity of at least 1.0 at a temperature of from 20° to 50° C.
14. A process for preparing clear elastic films of a copolymer of propiolactone and 50 to 76 percent (by weight) of pivalolactone, which comprises line-drawing a copolymer of unoriented propiolactone and 50 to 76 percent by weight of pivalolactone having an inherent viscosity of at least 1.0 at a temperature of from 50° to 90° C.

References Cited

UNITED STATES PATENTS

| | | | |
|---|---|---|---|
| 2,658,055 | 11/1953 | Alderson | 260—78.3 |
| 2,683,136 | 7/1954 | Higgins | 260—78.3 |
| 3,190,858 | 6/1965 | Cox et al. | 260—78.3 |
| 3,300,451 | 1/1967 | Jackson et al. | 260—78.3 |

FOREIGN PATENTS

| | | |
|---|---|---|
| 1,231,163 | 4/1960 | France. |
| 592,333 | 7/1960 | Belgium. |

WILLIAM H. SHORT, *Primary Examiner.*

M. GOLDSTEIN, *Assistant Examiner.*

260—78.3, 30.4, 32.8; 117—127, 148; 161—231